(12) United States Patent
Orcutt

(10) Patent No.: US 7,865,472 B1
(45) Date of Patent: Jan. 4, 2011

(54) METHODS AND SYSTEMS FOR RESTORING FILE SYSTEMS

(75) Inventor: Niel Orcutt, Pleasant Gove, UT (US)

(73) Assignee: Symantec Corporation, Mountain View, CA (US)

( * ) Notice: Subject to any disclaimer, the term of this patent is extended or adjusted under 35 U.S.C. 154(b) by 424 days.

(21) Appl. No.: 11/864,196

(22) Filed: Sep. 28, 2007

(51) Int. Cl.
*G06F 7/00* (2006.01)
*G06F 17/00* (2006.01)

(52) U.S. Cl. ........................................ 707/640; 707/679

(58) Field of Classification Search ................... 707/640
See application file for complete search history.

(56) References Cited

U.S. PATENT DOCUMENTS

| | | | |
|---|---|---|---|
| 5,835,953 A | 11/1998 | Ohran | |
| 6,378,054 B1 | 4/2002 | Karasudani et al. | |
| 6,415,300 B1 | 7/2002 | Liu | |
| 7,165,154 B2 | 1/2007 | Coombs et al. | |
| 7,222,233 B1 | 5/2007 | Rubin | |
| 2002/0107877 A1* | 8/2002 | Whiting et al. | 707/204 |
| 2005/0010616 A1* | 1/2005 | Burks | 707/204 |
| 2006/0041727 A1* | 2/2006 | Adkins et al. | 711/162 |
| 2006/0179083 A1* | 8/2006 | Kulkarni et al. | 707/204 |
| 2007/0130233 A1* | 6/2007 | Christensen | 707/204 |

* cited by examiner

*Primary Examiner*—John R. Cottingham
*Assistant Examiner*—Nicholas E Allen
(74) *Attorney, Agent, or Firm*—Holland & Hart LLP

(57) ABSTRACT

Systems and methods for restoring data in a file system are disclosed. In one method, a backup copy of a first file to be restored may be identified, the location of the backup copy may be determined, the original location of the first file within the file system may be determined, and the first file may be restored by copying the backup copy of the first file to the original location of the first file within the file system. The backup copy of the first file may comprise a copy of contents of the first file and a file header comprising file-location information that identifies the original location of at least a portion of the first file within the file system. Exemplary computer-readable media comprising computer-executable instructions for restoring data are also disclosed.

20 Claims, 9 Drawing Sheets

METHODS AND SYSTEMS FOR RESTORING FILE SYSTEMS

BACKGROUND

Conventional methods for backing up data from a computing system may be divided into two distinct approaches: file-by-file backups and block-by-block backups. In a file-by-file backup, each file in a file system is copied and backed up as a discrete file. For example, in a conventional file-by-file backup, each piece of data for a file, irrespective of the physical or logical location of the data within the file system that comprises the file, is copied into a single sequential block that is stored in a backup storage device.

Although a file-by-file backup preserves the file or directory structure of a file system, which allows individual files to be selectively accessed and restored, file-by-file backups fail to preserve the original physical or logical layout of the data comprising the files within the file system. In file systems, the actual physical blocks of data corresponding to each file are not generally stored in a contiguous or linear order. In practice, there is considerable physical discontinuity of recorded data blocks, both within individual files, and from file-to-file in a file system. Moreover, in many file systems the actual physical location of the blocks of data that comprise each file may be organized so as to optimize the performance of the file system. However, because file-by-file backups fail to preserve the preferred or optimized layout of the original file system, the performance of a file system that has been restored from a file-by-file backup may suffer.

A block-by-block backup, in contrast, preserves the original layout of a file system by copying and backing up data block-by-block without regard to the file or directory structure of the file system. For example, conventional block-by-block backups sequentially copy and backup each block of data in a file system in the physical order in which it is organized within the file system. However, because block-by-block backups fail to preserve the file and directory structure of the backed-up file system, it is difficult to mount and search block-by-block backups for individual files.

Incremental backups (which typically only backup data that has been changed since the last backup operation) are also performed with difficulty on a file system that is regularly defragmented using the block-by-block approach due to various impediments and inefficiencies. For example, even if linearly recorded at the outset, the blocks of data that comprise the files in a computing system may become fragmented as the data blocks are read, written, and edited during normal usage. This fragmentation may result in significant and inefficient disk-head repositioning during read and write operations. In an attempt to remedy this, a defragmentation operation may be performed to arrange the pieces of each file in the file system contiguously, or at least closer together, by changing the locations of data blocks. However, because the contents of many, if not the majority, of each data block in a file system may be changed during defragmentation (even if the actual files in the file system may not have changed), it is difficult and inefficient to attempt to perform an incremental backup of a file system that is regularly defragmented using the block-by-block approach.

SUMMARY

In certain embodiments, a computer-implemented method for restoring data in a file system may comprise identifying a backup copy of the first file to be restored, locating the backup copy of the first file to be restored, determining, by reading the file header of the backup copy, the original location of the first file within the file system, and restoring the first file by copying the backup copy of the first file to the original location of the first file within the file system. The backup copy of the first file may comprise a copy of the contents of the first file and a file header comprising file-location information that identifies an original location of the first file within the file system.

In at least one embodiment, determining the original location of the first file within the file system may comprise determining an original location, within the file system, of at least a beginning data block of the first file. The file-location information may identify an original location, within the file system, of at least a beginning data block of the first file. In addition, restoring the first file may comprise copying a beginning data block of the backup copy of the first file to the original location of the beginning data block of the first file within the file system.

In certain embodiments, restoring the first file may comprise determining whether the original location of the first file within the file system is available. If the original location is available, the backup copy of the first file may be copied to the original location of the first file. If the original location is not available, an available location that is proximate to the original location may be identified and the backup copy of the first file may be copied to the available location.

In an additional embodiment, restoring the first file may comprise determining whether the original location of at least the beginning data block of the first file is available. If the original location of the beginning data block of the first file is available, at least a beginning data block of the backup copy of the first file may be copied to the original location of the beginning data block of the first file. However, if the original location of the beginning data block of the first file is not available, an available location that is proximate to the original location of the beginning data block of the first file may be identified and at least the beginning data block of the backup copy of the first file may be copied to the available location.

In at least one embodiment, the file header may further comprise file identification information that comprises at least a name of the first file or a file-system path of the first file. The file header may also further comprise file-attribute information that comprises file-size information for the first file, access-rights information for the first file, or time-stamp information for the first file.

In certain embodiments, locating the backup copy of the first file to be restored may comprise identifying a most-recent backup copy from within a plurality of backup copies of the first file by comparing time-stamp information contained in file headers of the plurality of backup copies. Similarly, determining the original location of the first file within the file system may comprise identifying, based on file-location information contained in a file header of the most-recent backup copy, the location of the first file within the file system. In addition, restoring the first file may comprise retrieving the backup copy from a local storage device or retrieving the backup copy from a remote storage device.

In at least one embodiment, a computer readable medium may comprise a first computer-executable instruction operable to identify a backup copy of a first file to be restored, a second computer-executable instruction operable to locate the backup copy of the first file, a third computer-executable instruction operable to determine, by reading the file header of the backup copy, the original location of the first file within the file system, and a fourth computer-executable instruction operable to restore the first file by copying the backup copy of the first file to the original location of the first file within the file system. The backup copy of the first file may comprise a copy of the contents of the first file and a file header comprising file-location information that identifies an original location of the first file within the file system.

In at least one embodiment, the third computer-executable instruction operable to determine the original location of the first file within the file system may comprise a computer-executable instruction operable to determine an original location, within the file system, of at least a beginning data block of the first file. In addition, the file-location information may identify an original location, within the file system, of at least a beginning data block of the first file.

In certain embodiments, the fourth computer-executable instruction operable to restore the first file may comprise one or more computer-executable instructions operable to copy a beginning data block of the backup copy of the first file to the original location of the beginning data block of the first file within the file system.

In at least one embodiment, the fourth computer-executable instruction operable to restore the first file may comprise one or more computer-executable instructions operable to determine whether the original location of the first file within the file system is available. If the original location is available, the backup copy of the first file may be copied to the original location of the first file. However, if the original location is not available, an available location that is proximate to the original location may be identified and the backup copy of the first file may be copied to the available location.

In an alternative embodiment, a fourth computer-executable instruction operable to restore the first file may comprise one or more computer-executable instructions operable to determine whether the original location of at least the beginning data block of the first file is available. If the original location of the beginning data block of the first file is available, at least the beginning data block of the backup copy of the first file may be copied to the original location of the beginning data block of the first file. However, if the original location of the beginning data block of the first file is not available, an available location that is proximate to the original location of the beginning data block of the first file may be identified and at least the beginning data block of a backup copy of the first file may be copied to the available location.

In certain embodiments, the second computer-executable instruction operable to locate the backup copy of the first file may comprise one or more computer-executable instructions operable to identify the most-recent backup copy from within a plurality of backup copies of the first file by comparing time-stamp information contained in file headers of the plurality of backup copies. In addition, the third computer-executable instruction operable to determine the original location of the first file within the file system may comprise one or more computer-executable instructions operable to identify, based on file-location information contained in a file header of the most-recent backup copy, the location of the first file within the file system. In at least one embodiment, the fourth computer-executable instruction operable to restore the first file may comprise one or more computer-executable instructions operable to retrieve the backup copy from a local storage device or a remote storage device.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of exemplary embodiments and are a part of the specification. Together with the following description, these drawings demonstrate and explain various principles of the instant disclosure.

Figure 1A:
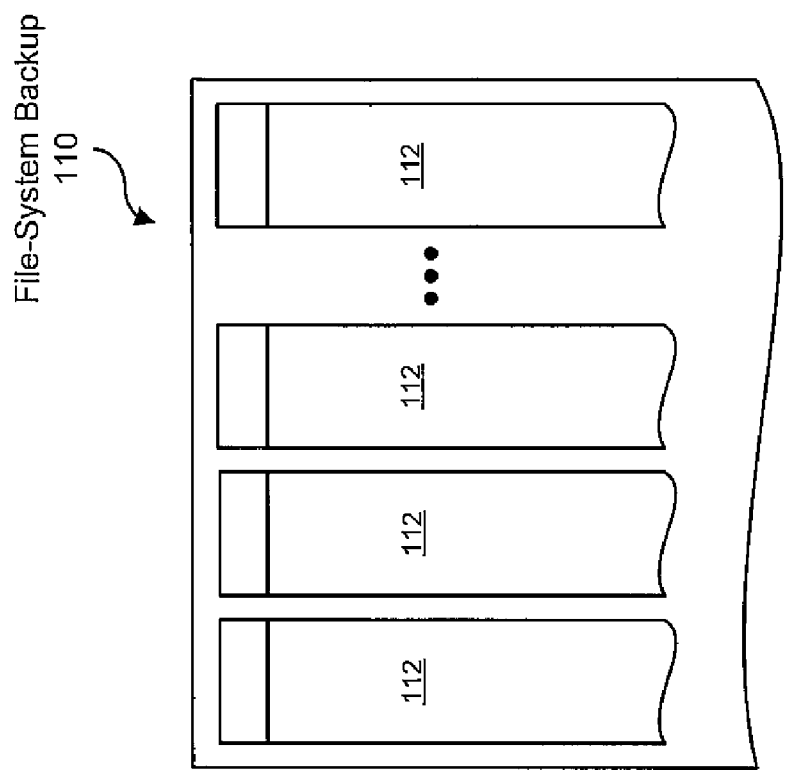
FIGS. 1A-1B are illustrations of an exemplary file system and an exemplary file-system backup according to at least one embodiment.
Figure 1A:
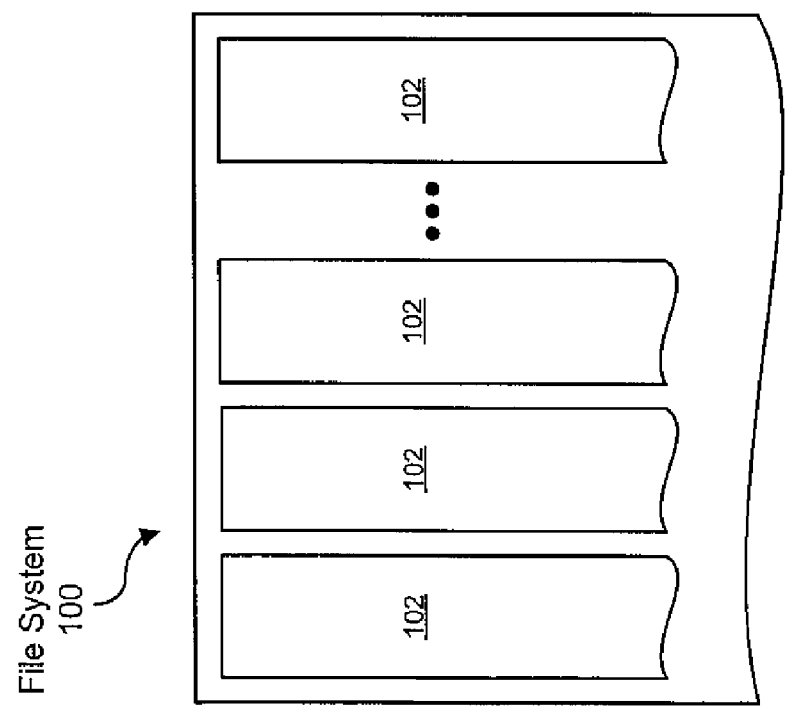

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION OF EXEMPLARY EMBODIMENTS

Figure 1B:
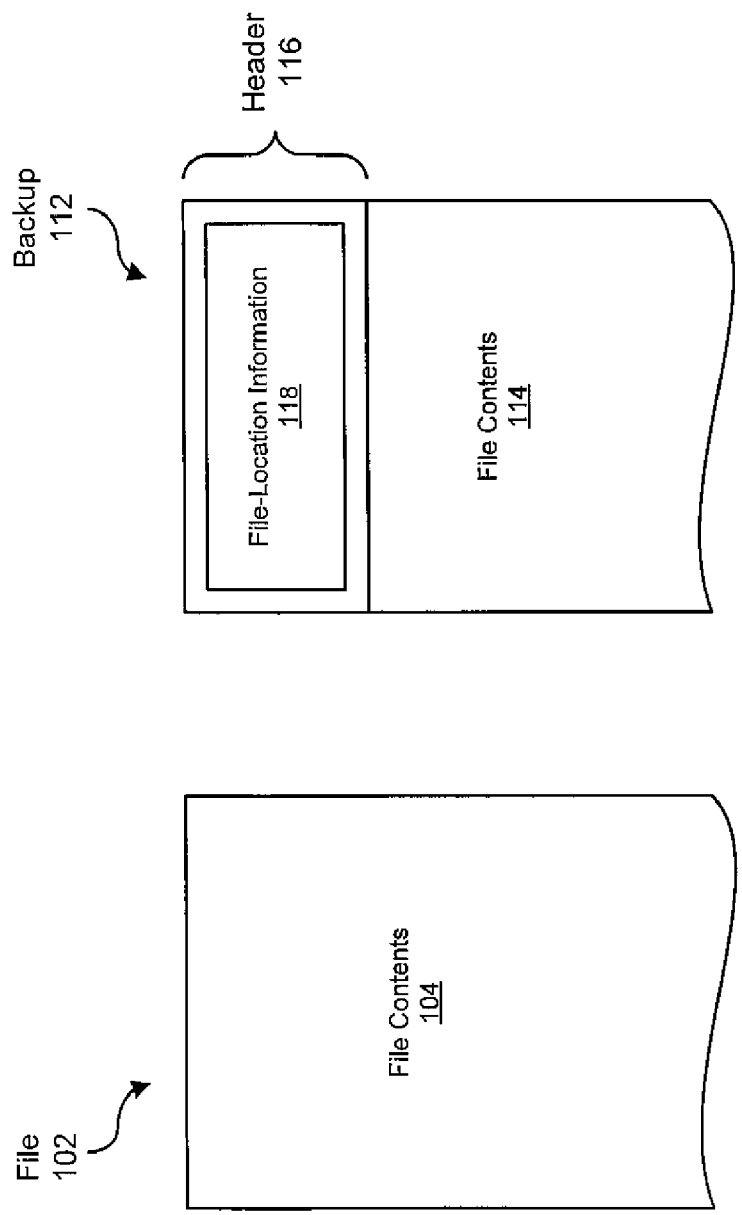

The instant disclosure relates generally to methods and systems for backing up and restoring data files on a computing system. FIGS. 1A-1B are illustrations of an exemplary file system 100, at least a potion of which may be backed up and restored as a file-system backup 110. File system 100 generally represents any type or form of file system, including a disk file system, a flash file system, a database file system, a transactional file system, a network file system, a special-purpose file system, or any other suitable file system. Examples of file system 100 include, without limitation, FAT, FAT32, NTFS, HFS, HFS+, ext2, ext3, ISO 9660, ODS-5, UDF, JFFS2, YAFFS, procfs, and clients for NFS or SMB protocols. In one embodiment, data within file system 100 may be organized into one or more data blocks or clusters.

As illustrated in FIG. 1A, file system 100 may comprise one or more files 102. Files 102 may represent any type or form of computer file containing data or information, generally represented as file contents 104 in FIG. 1B. One or more of files 102 may be contained within a single data block in file system 100 or distributed across a plurality of contiguous or non-contiguous data blocks within file system 100. For example, a first portion of a file 102 may be stored in a first data-block location within file system 100, while a second portion of file 102 may be stored in a second data-block location within file system 100 that is either contiguous or non-contiguous with the first data-block location.

In at least one embodiment, at least a portion of file system 100 may be backed up by creating and storing a file-system backup 110. File-system backup 110 generally represents any type or form of file-system backup. Examples of file-system backup 110 include, without limitation, incremental backups, differential backups, partial backups, full backups, or the like. As illustrated in FIG. 1A, file-system backup 110 may comprise one or more individual file backups 112 (sometimes generally referred to herein as a "backup copy" of a file). Individual file backups 112 generally represent backups of an individual file, such as file 102. A representation of an exemplary individual file backup 112, comprising file contents 114 and a header 116, is provided in FIG. 1B.

In certain embodiments, backup 112 may contain a copy of all or a part of the contents of a file. For example, as illustrated in FIG. 1B, a copy of at least a portion of file contents 104 of file 102 may be stored as file contents 114 in backup 112. Backup 112 may also comprise a header 116 that comprises metadata, or information or data about file contents 114.

In one embodiment, header 116 of backup 112 may comprise file-location information 118. File-location information 118 may identify the location within file system 100, as identified at the time backup 112 is created, of at least a portion of file 102 (a copy of the contents of which may be stored as file contents 114 in backup 112, as explained above). For example, file-location information 118 may identify the location (e.g., physical location or logical address) of each portion of file 102 within file system 100 at the time backup 112 is created, even if file 102 is distributed across a plurality of contiguous or non-contiguous data blocks within file system 100. Alternatively, file-location information 118 may identify the location of only a portion of file 102 within file system 100. For example, file-location information 118 may identify the location (e.g., physical location or logical address) of a single portion of file 102 (e.g., a first or beginning data block) within file system 100 at the time backup 112 is created.

Figure 2:
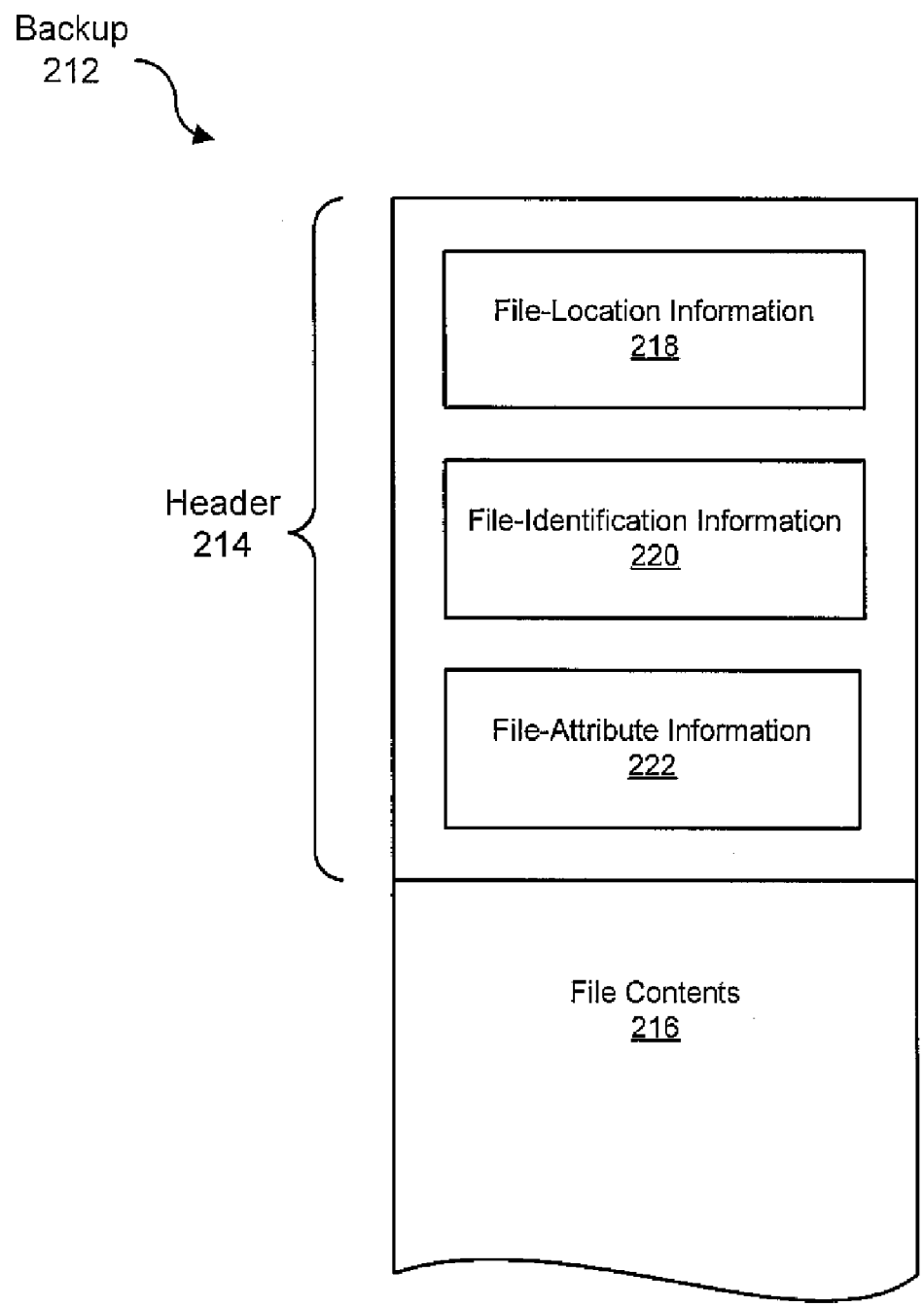
FIG. 2 is an illustration of an exemplary file and individual file backup according to at least one embodiment.

The header of each individual file backup may also comprise additional information in addition to the file-location information. For example, as illustrated in FIG. 2, an exemplary backup 212 may comprise a header 214 comprising file-location information 218, file-identification information 220, and file-attribute information 222. File-identification information 220 may contain any identifying information about the backed-up file (a copy of the contents of which may be stored as file contents 216 in backup 212, as explained above), such as the name of the backed-up file or the file-system path of the backed-up file. For example, file-identification information 220 may indicate that the backed-up file is named "backed_up_file" and is stored in the NTFS path "C:\WINDOWS\system\backed_up_file."

File-attribute information 222 may identify various attributes of a backed-up file. For example, file-attribute information 222 may comprise file-size information, which may indicate the size of the backed-up file, access-rights information, which may indicate whether the backed-up file is read- or write-protected, and time-stamp information, which may indicate when the backed-up file was last modified or originally created. Although not illustrated, header 214 may also comprise data relating to backup 212 itself, such as the version of backup 212 (for use in incremental backups) or a time-stamp indicating when backup 212 was created or will expire.

Figure 3:
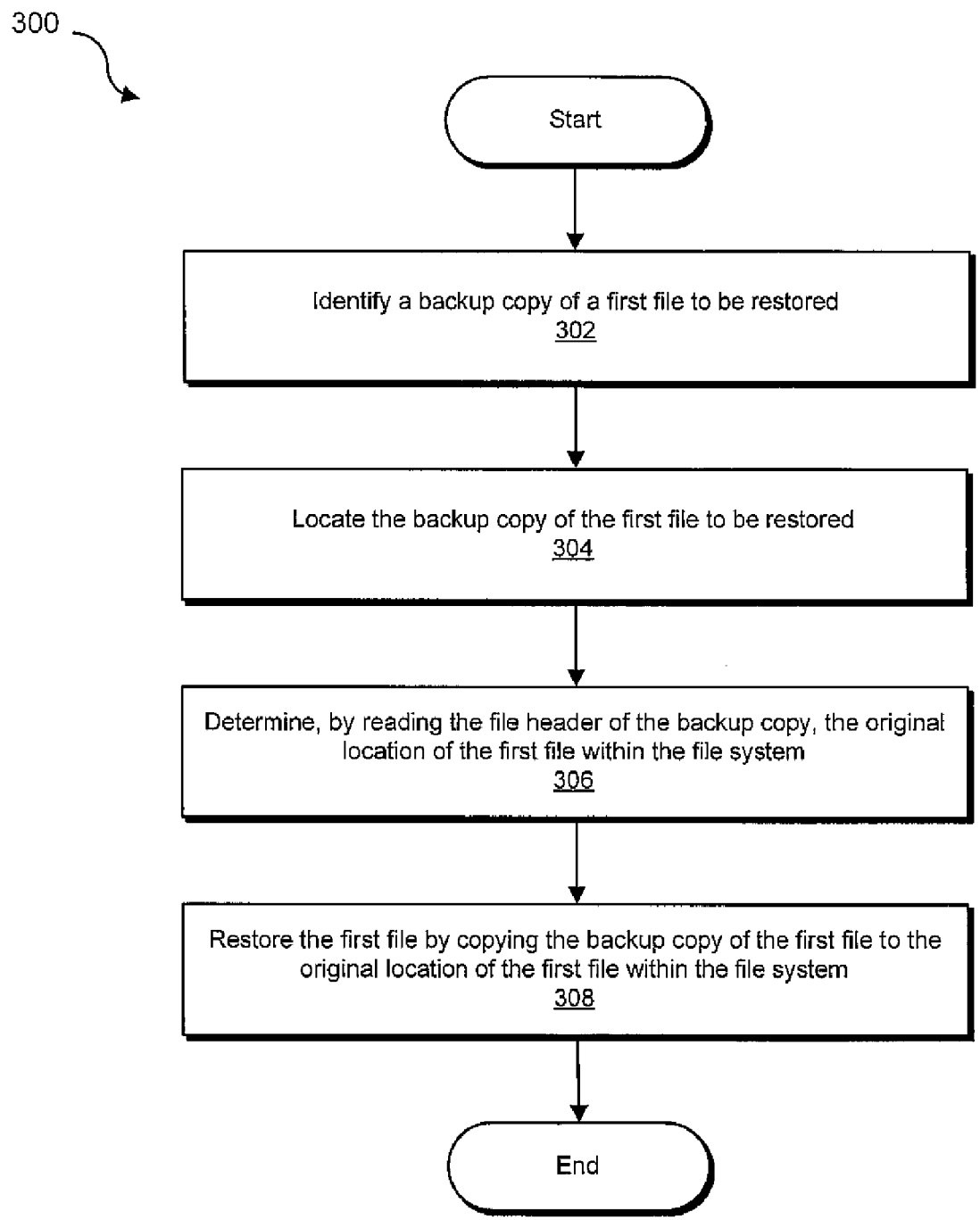
FIG. 3 is a flow diagram of an exemplary computer-implemented method for restoring data in a file system according to at least one embodiment.

FIG. 3 is a flow diagram of an exemplary computer-implemented method 300 for restoring data in a file system according to at least one embodiment. As illustrated in this figure, at step 302 a backup copy (such as backup 112 in FIGS. 1A-1B) of a first file to be restored may be identified. At step 304, the backup copy of the first file to be restored may be located. As will be explained in detail below, the backup copy of the first file may be locally stored on a local storage device or remotely stored on a remote storage device. Accordingly, locating the backup copy of the first file may comprise searching for the backup copy of the first file within a local storage device or a remote storage device.

At step 306, the original location of the first file within the file system may be determined by reading the file header of the backup copy. As detailed above, the backup copy of a first file may comprise a copy of the contents of the first file and/or a file header (such as file header 116 in FIG. 1B) comprising file-location information that identifies an original location of the first file within the file system. For example, in certain embodiments the file-location information may identify the location (e.g., physical location or logical address) of each portion of the file within the file system, even if the file is distributed across a plurality of contiguous or non-contiguous data blocks within the file system. Alternatively, as discussed in greater detail below in connection with FIG. 4, the file-location information may identify the location of only a portion of the file within the file system. For example, the file-location information may identify the location (e.g., physical location or logical address) of a single portion of the file (e.g., a first or beginning data block) within the file system.

At step 308, the first file may be restored by copying the backup copy of the first file to the original location of the first file within the file system. In certain embodiments, copying the backup copy of the first file to the original location of the first file within the file system may comprise copying each portion of the backup copy of the first file to the corresponding original location of each portion of the first file within the file system, even if the first file was originally distributed across a plurality of contiguous or non-contiguous data blocks within the file system.

Alternatively, copying the backup copy of the first file to the original location of the first file within the file system may comprise copying only a portion of the backup copy of the first file to the corresponding original location of a portion of the first file within the file system. For example, as detailed above, in certain embodiments the file-location information stored in the file header of a backup copy of a file may identify the location of only a portion of the file within the file system. For example, the file-location information may identify the location (e.g., physical location or logical address) of a single portion of a first file (e.g., a first or beginning data block) within the file system. In this embodiment, copying the backup copy of the first file to the original location of the first file within the file system may comprise copying only a portion of the backup copy of the first file to the original location of the portion of the first file that is identified in the file header of the backup copy.

When only a portion of a backup copy of a first file is initially copied to the original location of the portion of the first file that is identified in the file header of the backup copy, remaining portions of the backup copy may be restored or copied in any number of ways. For example, the remaining portions of the backup copy of the first file may be copied to available data-block locations that are adjacent or contiguous to, or follow sequentially from, the data-block location in which the first portion of the backup copy has been stored. In an additional embodiment, as will be explained in connection with FIG. 5 below, the remaining portions of the backup copy may also be copied or stored in the same "zone," as specified by the file system, in which the first portion of the backup copy was copied or stored. After step 308, the process flow of exemplary method 300 may then terminate.

Figure 4:
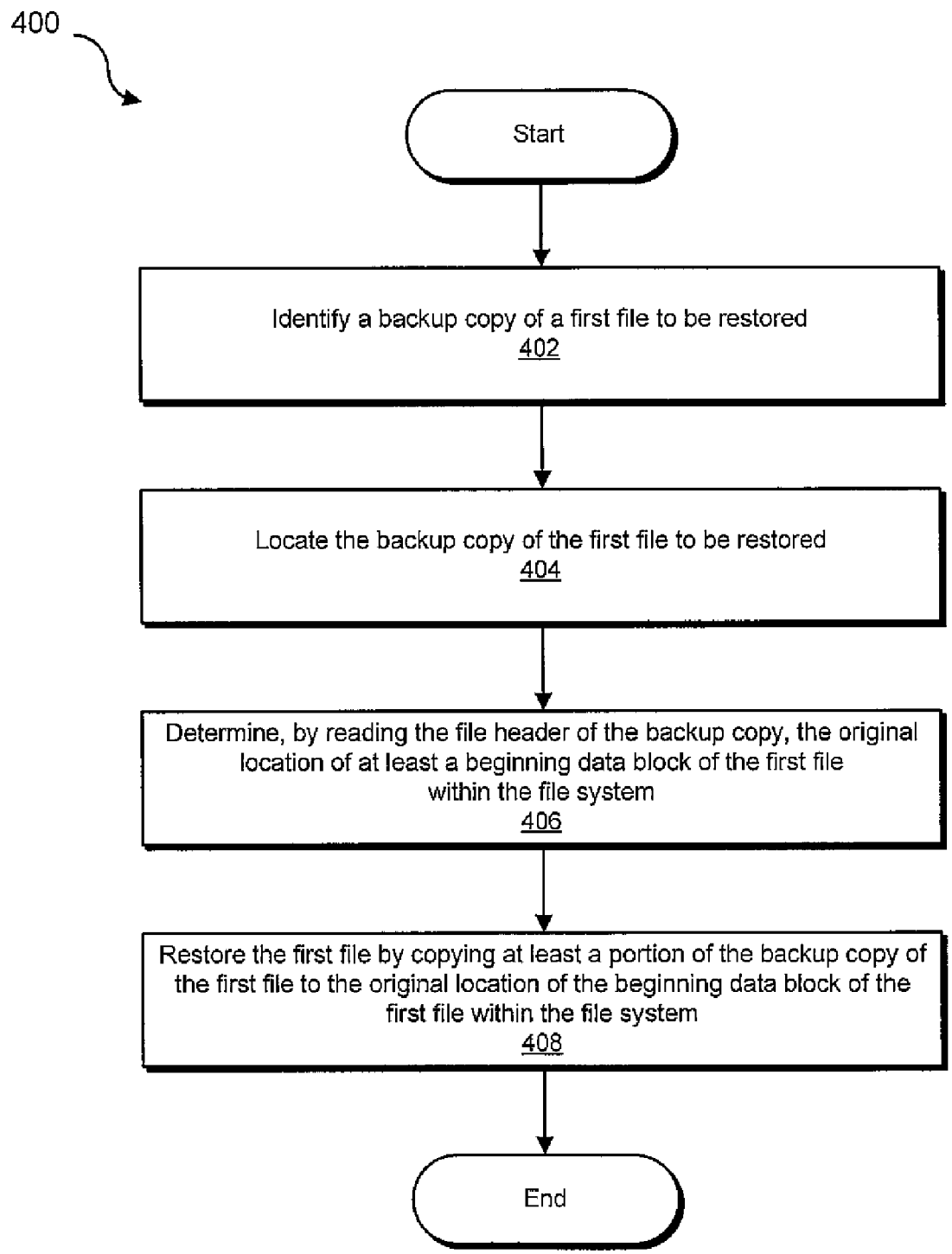
FIG. 4 is a flow diagram of an exemplary computer-implemented method for restoring data in a file system according to an additional embodiment.

As detailed below, an individual file backup may comprise file-location information that may identify the location (e.g., logical address), within a file system, of each block of data comprising a file or, alternatively, the location of only a portion of the file within the file system. For example, the file-location information in the header of an individual file backup may identify the location (e.g., logical address) of only a single portion of a file (e.g., a first or beginning data block) within the file system. FIG. 4 is a flow diagram of an exemplary computer-implemented method 400 for restoring data in a file system in which a backup copy of a file may comprise a file header that identifies the original location, within the file system, of only a portion of the file.

As illustrated in this figure, at step 402 a backup copy (such as backup 112) of a first file to be restored may be identified. At step 404, the backup copy of the first file to be restored may be located. As will be explained in detail below, the backup copy of the first file may be locally stored on a local storage device or remotely stored on a remote storage device. Accordingly, locating the backup copy of the first file may comprise searching for the backup copy of the first file within a local storage device or a remote storage device.

At step 406, the original location of at least a beginning data block of the first file within the file system may be determined by reading the file header of the backup copy. In certain embodiments, the original location of the beginning data block of the first file may represent the original location of a data block within which a first or beginning portion of the first file was stored in the file system.

At step 408, the first file may be restored by copying at least a portion of the backup copy of the first file to the original location of the beginning data block of the first file within the file system. For example, a single portion (e.g., a first or beginning data block) of the backup copy of the first file may be copied to the original location (e.g., physical or logical address) of a first portion (e.g., a first or beginning data block) of the first file within the file system. Remaining portions of the backup copy may then be restored or copied in any number of ways. For example, the remaining portions of the backup copy of the first file may be copied to available datablock locations that are adjacent or contiguous to, or follow sequentially from, the data-block location in which the first portion of the backup copy has been stored. In an additional embodiment, as will be explained in connection with FIG. 5 below, the remaining portions of the backup copy may also be copied or stored in the same "zone," as specified by the file system, in which the first portion of the backup copy was copied or stored. After step 408, the process flow of exemplary method 400 may then terminate.

Figure 5:
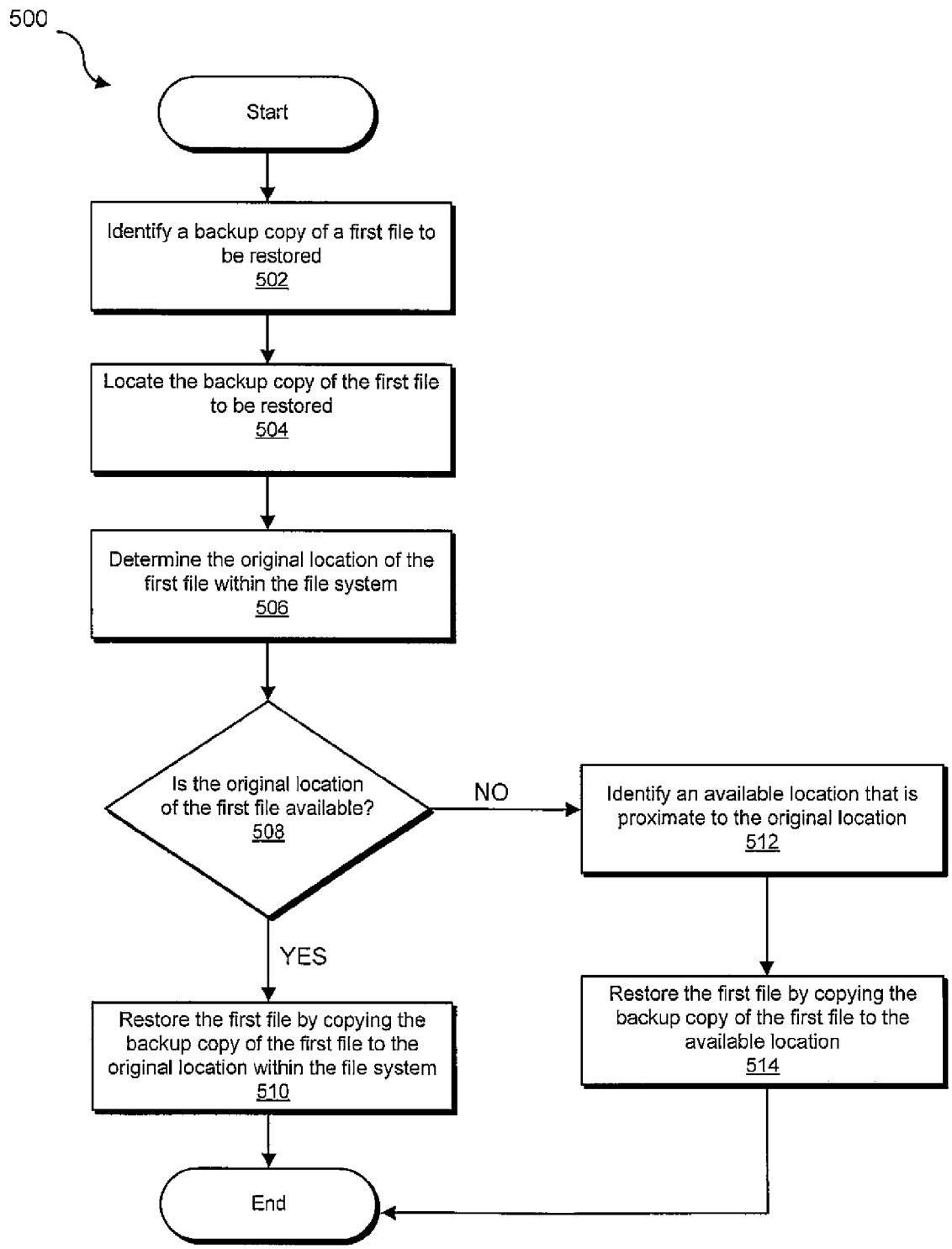
FIG. 5 is a flow diagram of an exemplary computer-implemented method for restoring data in a file system according to an additional embodiment.

As detailed above, when a file system (such as file system 100) becomes fragmented, a file system defragmentation process may be performed. When this occurs, the contents of many, if not the majority, of each data block in the file system may be changed, even if the content of the actual file itself may not have changed. FIG. 5 is a flow diagram of an exemplary method 500 for restoring data in a file system in which a file system defragmentation process has been performed. As illustrated in this figure, at step 502 a backup copy (such as backup 112) of a first file to be restored may be identified. At step 504, a backup copy of the first file to be restored may be located. At step 506, the original location of the first file within the file system may be determined by reading the file header of the backup copy.

At 508, the system may determine whether the original location of the first file within the file system is available. In certain embodiments, determining whether the original location of the first file within the file system is available may comprise determining whether data, such as data rearranged or reorganized during a defragmentation process, currently occupies the original location (or locations) or at least a portion of the file within the file system. If the original location of the first file is available, at step 510 the first file may be restored by copying the backup data of the first file to the original location (or locations) of the first file. However, if the original location is not available, at step 512 the system may identify an available location that is proximate to the original location. At step 514, the first file may be restored by copying the backup copy of the first file to the available location. The process flow of exemplary method 500 may then terminate.

In an additional embodiment, determining whether the original location of the first file within the file system is available (at step 508) may comprise determining whether the original location of at least the beginning data block of the first file is available. If the original location of the beginning data block of the first file is available, at least a beginning data block of the backup copy of the first file may be copied to the original location of the beginning data block of the first file. However, if the original location of the beginning data block of the first file is not available, at step 512 the system may identify an available location that is proximate to the original location of the beginning data block of the first file. At step 514, the first file may be restored by copying at least the beginning data block of the backup copy of the first file to the available location. The process flow of exemplary method 500 may then terminate.

The available location proximate to the original location specified in steps 512 and 514 of FIG. 5 may be identified in any number of ways. For example, in certain embodiments the system may identify available data blocks within the file system that follow contiguously or sequentially from the original location of the first file. An available location may also be identified by determining the "zone," as specified by the file system, within which at least a portion of the first file was originally located.

As detailed above, one or more backup copies or versions of a file may be created during a backup process, such as during an incremental backup process. For example, a first backup copy of a first file may be created at a first point in time and a second backup copy of the first file may be created at a second point in time. In certain embodiments, the second point in time in may occur after the first point in time. For example, the first point in time may represent the state of a file system prior to being defragmented, while the second point in time may represent the state of a file system after being defragmented. Accordingly, the location of the first file within the file system at the first point in time may differ from or, alternatively, be identical to, the location of the first file within the file system at the second point in time.

In at least one embodiment, a first backup copy of the first file may comprise a copy of contents of the first file and a file header comprising file-location information that identifies the location, at a first point in time, of at least a portion of the first file within the file system. The first backup copy may also comprise time-stamp information that identifies the first point in time. Similarly, the second backup copy of the first file may comprise a copy of the contents of the first file and a file header comprising file-location information that identifies, at a second point in time, the location of at least a portion of the first file within the file system. The file header of the second backup copy of the first file may also comprise time-stamp information that identifies the second point in time.

Figure 6:
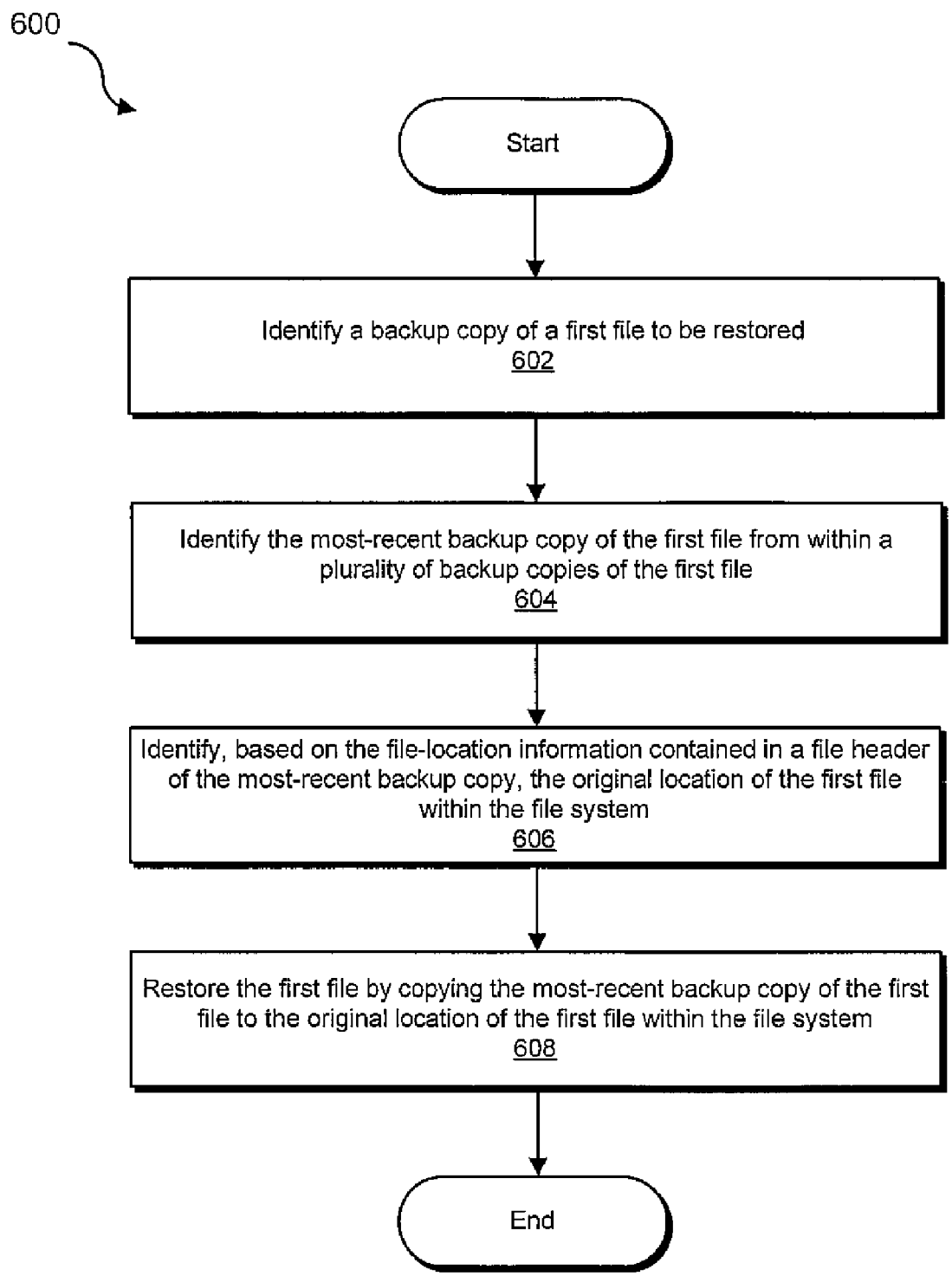
FIG. 6 is a flow diagram of an exemplary computer-implemented method for restoring data in a file system according to an additional embodiment.

FIG. 6 is a flow diagram of an exemplary computer-implemented method 600 for restoring data in a file system in which multiple backup copies or versions have been created. As illustrated in this figure, at step 602 a backup copy of a first file to be restored may be identified. At step 604, the most-recent backup version or copy from within a plurality of backup copies of the first file may be identified. This most-recent backup version or copy may be identified in any number of ways. For example, the most-recent backup copy or version may be identified by comparing time-stamp information contained in file headers of each of the plurality of backup copies, as detailed above.

At step 606, the original location of the first file within the file system may be determined. In certain embodiments, this original location may be determined by reading the file-location information contained in a file header of the most-recent backup version or copy identified in step 604. At step 608, the first file may be restored by copying the most-recent backup copy of the first file to the original location of the first file within the file system. The process flow of exemplary method 600 may then terminate.

The exemplary systems and methods disclosed herein may combine many of the advantages of block-by-block and file-by-file backup systems, while avoiding many of their disadvantages. For example, as discussed above, file-location information may be used during a restore operation to place the contents of an individual file backup in a location within a file system that is identical or nearly identical to the original location of the contents of a file within a file system. Accordingly, the exemplary embodiments disclosed herein may enable the restoration of complete or partial file systems in a layout that is identical or nearly identical to the layout of the file system as it existed at the time the backup operation was performed, thereby potentially avoiding some of the performance losses that typically occur when conventional file systems organized in a preferred or optimum layout are restored in a manner that fails to preserve this preferred or optimum layout. In addition, because the exemplary file-system backups disclosed herein may be organized in a file-by-file manner, individual files may be selectively accessed and restored. The organized file and directory structure of the exemplary file-system backups disclosed herein may also allow for incremental backups of file systems that are regularly defragmented.

Figure 7:
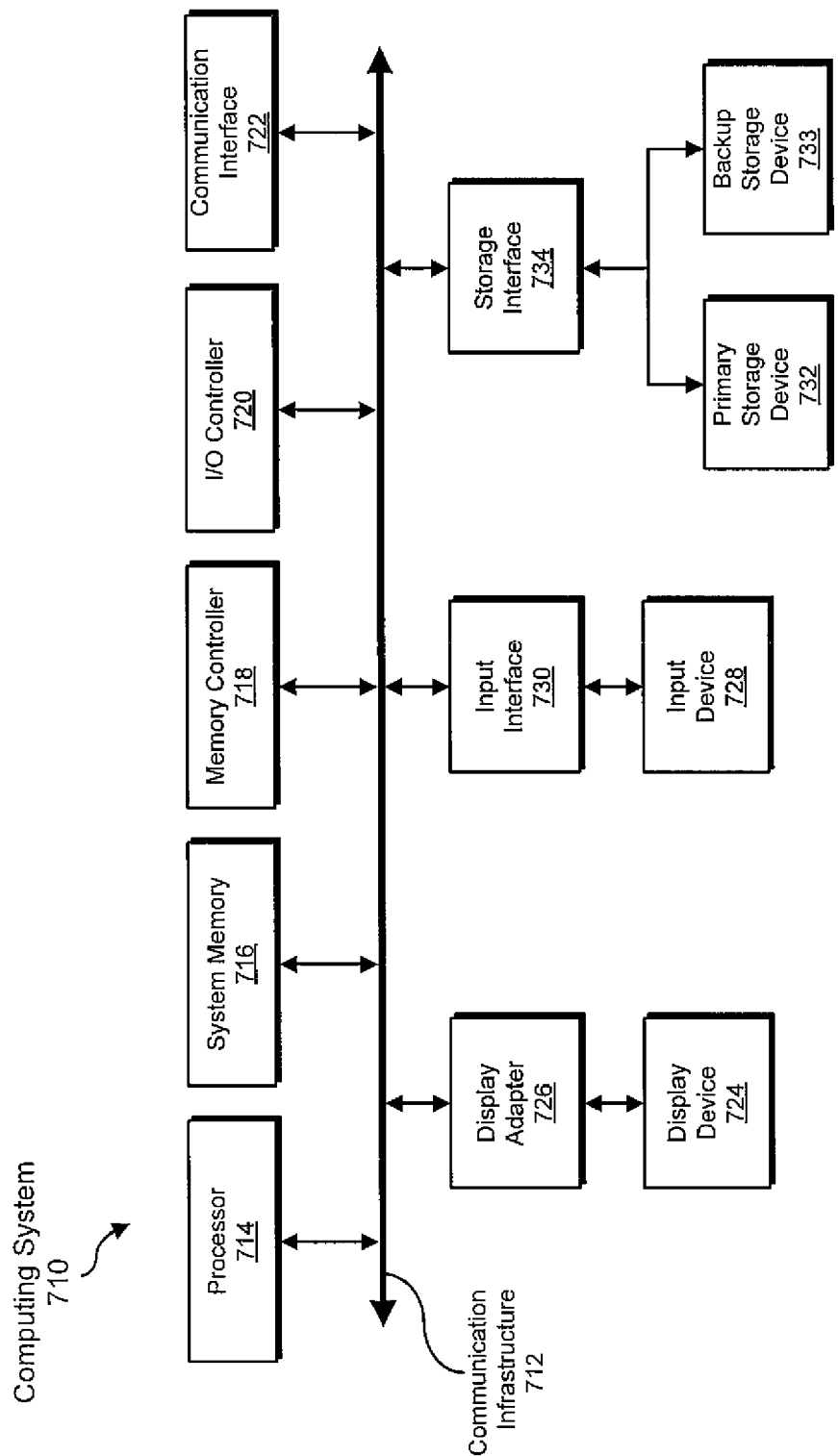
FIG. 7 is a block diagram of an exemplary computing system capable of implementing one or more of the embodiments described and/or illustrated herein.

FIG. 7 is a block diagram of an exemplary computing system 710 capable of implementing one or more of the embodiments described and/or illustrated herein. Computing system 710 broadly represents any single or multi-processor computing device or system capable of executing computer-readable instructions. Examples of computing system 710 include, without limitation, workstations, laptops, client-side terminals, servers, distributed computing systems, handheld devices, or any other computing system or device. In its most basic configuration, computing system 710 may comprise at least one processor 714 and a system memory 716.

Processor 714 generally represents any type or form of processing unit capable of processing data or interpreting and executing instructions. In certain embodiments, processor 714 may receive instructions from a software application or module. These instructions may cause processor 714 to perform the functions of one or more of the exemplary embodiments described and/or illustrated herein. For example, processor 714 may perform and/or be a means for performing, either alone or in combination with other elements, one or more of the identifying, determining, creating, storing, locating, restoring, copying, comparing, and retrieving steps described herein. Processor 714 may also perform and/or be a means for performing any other steps, methods, or processes described and/or illustrated herein.

System memory 716 generally represents any type or form of volatile or non-volatile storage device or medium capable of storing data and/or other computer-readable instructions. Examples of system memory 716 include, without limitation, random access memory (RAM), read only memory (ROM), flash memory, or any other suitable memory device. Although not required, in certain embodiments computing device 710 may comprise both a volatile memory unit (such as, for example, system memory 716) and a non-volatile storage device (such as, for example, primary storage device 732, as described in detail below).

In certain embodiments, exemplary computing system 710 may also comprise one or more components or elements in addition to processor 714 and system memory 716. For example, as illustrated in FIG. 7, computing system 710 may comprise a memory controller 718, an Input/Output (I/O) controller 718, and a communication interface 722, each of which may be interconnected via a communication infrastructure 712. Communication infrastructure 712 generally represents any type or form of infrastructure capable of facilitating communication between one or more components of a computing device. Examples of communication infrastructure 712 include, without limitation, a communication bus (such as an ISA, PCI, PCIe, or similar bus) and a network.

Memory controller 718 generally represents any type or form of device capable of handling memory or data or controlling communication between one or more components of computing system 710. For example, in certain embodiments memory controller 718 may control communication between processor 714, system memory 716, and I/O controller 720 via communication infrastructure 712. In certain embodiments, memory controller may perform and/or be a means for performing, either alone or in combination with other elements, one or more of the steps or features described and/or illustrated herein, such as identifying, determining, creating, storing, locating, restoring, copying, comparing, and retrieving.

I/O controller 720 generally represents any type or form of module capable of coordinating and/or controlling the input and output functions of a computing device. For example, in certain embodiments I/O controller may control or facilitate transfer of data between one or more elements of computing system 710, such as processor 714, system memory 716, communication interface 722, display adapter 726, input interface 730, and storage interface 734. I/O controller 720 may be used, for example, to perform and/or be a means for performing, either alone or in combination with other elements, one or more of the identifying, determining, creating, storing, locating, restoring, copying, comparing, and retrieving steps described herein. I/O controller 720 may also be used to perform and/or be a means for performing other steps and features set forth in the instant disclosure.

Communication interface 722 broadly represents any type or form of communication device or adapter capable of facilitating communication between exemplary computing system 710 and one or more additional devices. For example, in certain embodiments communication interface 722 may facilitate communication between computing system 710 and a private or public network comprising additional computing systems. Examples of communication interface 722 include, without limitation, a wired network interface (such as a network interface card), a wireless network interface (such as a wireless network interface card), a modem, and any other suitable interface. In at least one embodiment, communication interface 722 may provide a direct connection to a remote server via a direct link to a network, such as the Internet. Communication interface 722 may also indirectly provide such a connection through, for example, a local area network (such as an Ethernet network), a personal area network (such as a BLUETOOTH network), a telephone or cable network, a cellular telephone connection, a satellite data connection, or any other suitable connection.

In certain embodiments, communication interface 722 may also represent a host adapter configured to facilitate communication between computing system 710 and one or more additional network or storage devices via an external bus or communications channel. Examples of host adapters include, without limitation, SCSI host adapters, USB host adapters, IEEE 1394 host adapters, SATA and eSATA host adapters, ATA and PATA host adapters, Fibre Channel interface adapters, Ethernet adapters, or the like. Communication interface 722 may also allow computing system 710 to engage in distributed or remote computing. For example, communication interface 722 may receive instructions from a remote device or send instructions to a remote device for execution. In certain embodiments, communication interface 722 may perform and/or be a means for performing, either alone or in combination with other elements, one or more of the identifying, determining, creating, storing, locating, restoring, copying, comparing, and retrieving steps disclosed herein. Communication interface 722 may also be used to perform and/or be a means for performing other steps and features set forth in the instant disclosure.

As illustrated in FIG. 7, computing system 710 may also comprise at least one display device 724 coupled to communication infrastructure 712 via a display adapter 726. Display device 724 generally represents any type or form of device capable of visually displaying information forwarded by display adapter 726. Similarly, display adapter 726 generally represents any type or form of device configured to forward graphics, text, and other data from communication infrastructure 712 (or from a frame buffer, as known in the art) for display on display device 724.

As illustrated in FIG. 7, exemplary computing system 710 may also comprise at least one input device 728 coupled to communication infrastructure 712 via an input interface 730. Input device 728 generally represents any type or form of input device capable of providing input, either computer or human generated, to exemplary computing system 710. Examples of input device 728 include, without limitation, a keyboard, a pointing device, a speech recognition device, or any other input device. In at least one embodiment, input device 728 may perform and/or be a means for performing, either alone or in combination with other elements, one or more of the identifying, determining, creating, storing, locating, restoring, copying, comparing, and retrieving steps disclosed herein. Input device 728 may also be used to perform and/or be a means for performing other steps and features set forth in the instant disclosure.

As illustrated in FIG. 7, exemplary computing system 710 may also comprise a primary storage device 732 and a backup storage device 733 coupled to communication infrastructure 712 via a storage interface 734. Storage devices 732 and 733 generally represent any type or form of storage device or medium capable of storing data and/or other computer-readable instructions. For example, storage devices 732 and 733 may be a magnetic disk drive (e.g., a so-called hard drive), a floppy disk drive, a magnetic tape drive, an optical disk drive, a flash drive, or the like. Storage interface 734 generally represents any type or form of interface or device for transferring data between storage devices 732 and 733 and other components of computing system 710.

In certain embodiments, storage devices 732 and 733 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage devices 732 and 733 may also comprise other similar structures or devices for allowing computer software, data, or other computer-readable instructions to be loaded into computing system 710. For example, storage devices 732 and 733 may be configured to read and write software, data, or other computer-readable information. Storage devices 732 and 733 may also be a part of computing system 710 or may be a separate device accessed through other interface systems.

In certain embodiments, the exemplary file systems disclosed herein may be stored on primary storage device 732, while the exemplary file-system backups disclosed herein may be stored on backup storage device 733. Storage devices 732 and 733 may also be used, for example, to perform and/or be a means for performing, either alone or in combination with other elements, one or more of the identifying, determining, creating, storing, locating, restoring, copying, comparing, and retrieving steps disclosed herein. Storage devices 732 and 733 may also be used to perform and/or be a means for performing other steps and features set forth in the instant disclosure.

Many other devices or subsystems may be connected to computing system 710. Conversely, all of the components and devices illustrated in FIG. 7 need not be present to practice the embodiments descried and/or illustrated herein. The devices and subsystems referenced above may also be interconnected in different ways from that shown in FIG. 7. Computing system 710 may also employ any number of software, firmware, and/or hardware configurations. For example, one or more of the exemplary embodiments disclosed herein may be encoded as a computer program (also referred to as computer software, software applications, computer-readable instructions, or computer control logic) on a computer-readable medium. The phrase "computer-readable medium" generally refers to any form of device, carrier, or medium capable of storing or carrying computer-readable instructions. Examples of computer-readable media include recordable media (such as floppy disks and CD- or DVD-ROMs), transmission-type media (such as carrier waves), electronic-storage media, magnetic-storage media, optical-storage media, and other distribution systems.

The computer-readable medium containing the computer program may then be loaded into computing system 710. All or a portion of the computer program stored on the computer-readable medium may then be stored in system memory 716 and/or various portions of storage devices 732 and 733. When executed by processor 714, a computer program loaded into computing system 710 may cause processor 714 to perform and/or be a means for performing the functions of one or more of the exemplary embodiments described and/or illustrated herein. Additionally or alternatively, one or more of the exemplary embodiments described and/or illustrated herein may be implemented in firmware and/or hardware. For example, computing system 710 may be configured as an application specific integrated circuit (ASIC) adapted to implement one or more of the exemplary embodiments disclosed herein.

Figure 8:
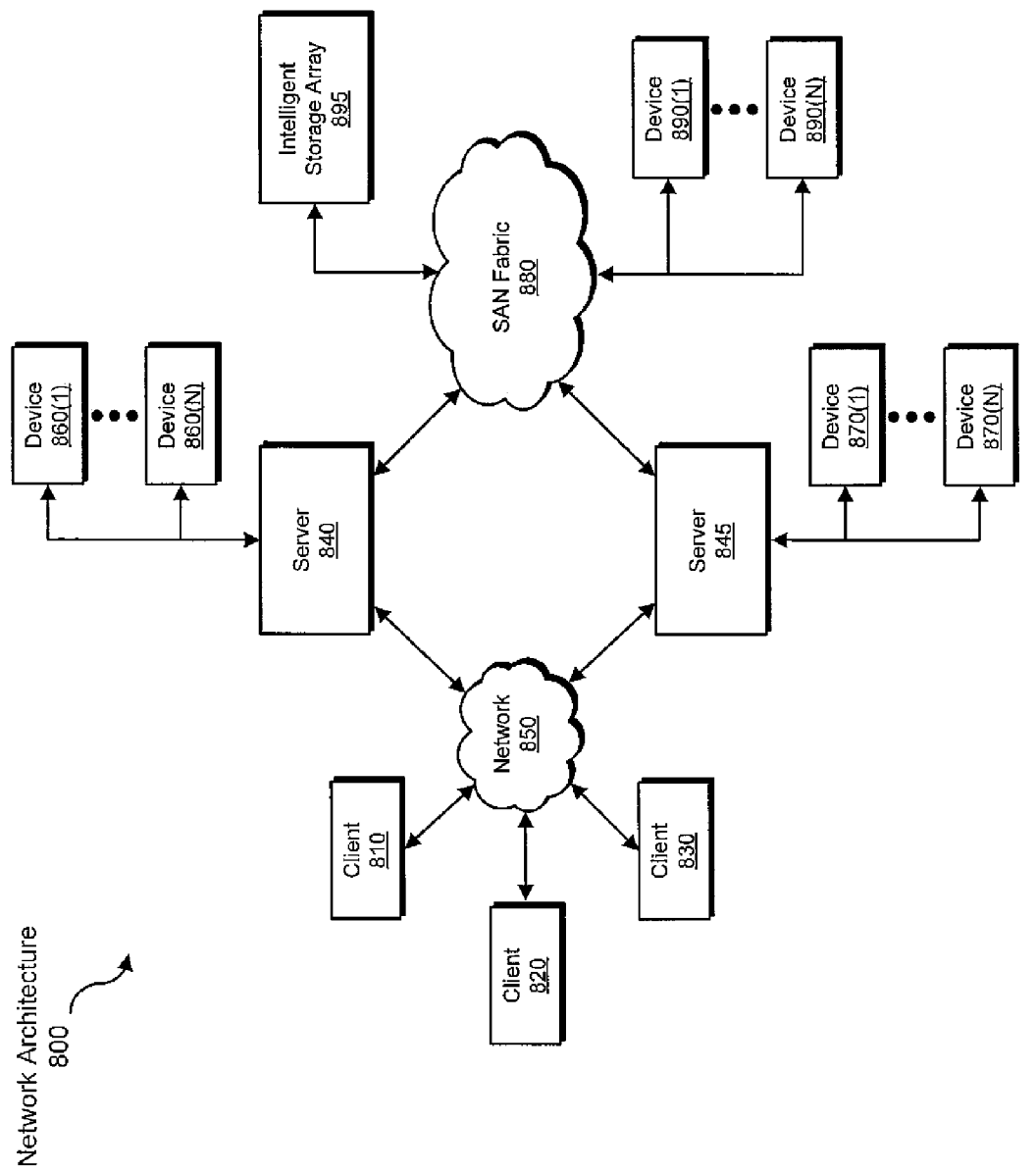
FIG. 8 is a block diagram of an exemplary computing system capable of implementing one or more of the embodiments described and/or illustrated herein.

FIG. 8 is a block diagram of an exemplary network architecture 800 in which client systems 810, 820, and 830 and servers 840 and 845 may be coupled to a network 850. Client systems 810, 820, and 830 generally represent any type or form of computing device or system, such as exemplary computing system 710 in FIG. 7. Similarly, servers 840 and 845 generally represent computing devices or systems, such as application servers or database servers, configured to provide various database services and/or to run certain software applications. Network 850 generally represents any telecommunication or computer network; including, for example, an intranet, a wide area network (WAN), a local area network (LAN), a personal area network (PAN), or the Internet.

As illustrated in FIG. 8, one or more storage devices 860(1)-(N) may be directly attached to server 840. Similarly, one or more storage devices 890(1)-(N) may be directly attached to server 845. Storage devices 860(1)-(N) and storage devices 890(1)-(N) generally represent any type or form of storage device or medium capable of storing data and/or other computer-readable instructions. In certain embodiments, storage devices 860(1)-(N) and storage devices 890(1)-(N) may represent network-attached storage (NAS) devices configured to communicate with servers 840 and 845 using various protocols, such as NFS, SMB, or CIFS.

Servers 840 and 845 may also be connected to a storage area network (SAN) fabric 880. SAN fabric 880 generally represents any type or form of computer network or architecture capable of facilitating communication between a plurality of storage devices. SAN fabric 880 may facilitate communication between servers 840 and 845 and a plurality of storage devices 890(1)-(N) and/or an intelligent storage array 895. SAN fabric 880 may also facilitate, via network 850 and servers 840 and 850, communication between client systems 810, 820, and 830 and storage devices 890(1)-(N) and/or intelligent storage array 895 in such a manner that devices 890(1)-(N) and array 895 appear as locally attached devices to client systems 810, 820, and 830. As with storage devices 860(1)-(N) and storage devices 870(1)-(N), storage devices 890(1)-(N) and intelligent storage array 895 generally represent any type or form of storage device or medium capable of storing data and/or other computer-readable instructions.

In certain embodiments, and with reference to exemplary computing system 710 of FIG. 7, a communication interface, such as communication interface 722 in FIG. 7, may be used to provide connectivity between each client system 810, 820, and 830 and network 850. Client systems 810, 820, and 830 may be able to access information on server 840 or 845 using, for example, a web browser or other client software. Such software may allow client systems 810, 820, and 830 to access data hosted by server 840, server 845, storage devices 860(1)-(N), storage devices 870(1)-(N), storage devices 890(1)-(N), or intelligent storage array 895. Although FIG. 8 depicts the use of a network (such as the Internet) for exchanging data, the embodiments described and/or illustrated herein are not limited to the Internet or any particular network-based environment.

In at least one embodiment, all or a portion of one or more of the exemplary embodiments disclosed herein may be encoded as a computer program and loaded onto and executed by server 840, server 845, storage devices 860(1)-(N), storage devices 870(1)-(N), storage devices 890(1)-(N), intelligent storage array 895, or any combination thereof. All or a portion of one or more of the exemplary embodiments disclosed herein may also be encoded as a computer program, stored in server 840, run by server 845, and distributed to client systems 810, 820, and 830 over network 850. Accordingly, network architecture 800 may perform and/or be a means for performing, either alone or in combination with other elements, one or more of the identifying, determining, creating, storing, locating, restoring, copying, comparing, and retrieving steps disclosed herein. Network architecture 800 may also be used to perform and/or be a means for performing other steps and features set forth in the instant disclosure.

For example, in certain embodiments the exemplary file systems disclosed herein may be stored on client systems 810, 820, and/or 830. Similarly, the exemplary file-system backups disclosed herein may be stored on server 840, server 845, storage devices 860(1)-(N), storage devices 870(1)-(N), storage devices 890(1)-(N), intelligent storage array 895, or any combination thereof.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered exemplary in nature since many other architectures can be implemented to achieve the same functionality.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

Furthermore, while various embodiments have been described and/or illustrated herein in the context of fully functional computing systems, one or more of these exemplary embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may configure a computing system to perform one or more of the exemplary embodiments disclosed herein.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "a" or "an," as used in the specification and claims, are to be construed as meaning "at least one of." In addition, for ease of use, the words "including" and "having," as used in the specification and claims, are interchangeable with and have the same meaning as the word "comprising."

What is claimed is:

1. A computer-implemented method for restoring data in a file system, comprising:
   identifying a backup copy of a first file to be restored;
   locating the backup copy of the first file to be restored, the backup copy comprising:
      a copy of contents of the first file;
      a file header comprising file-location information that identifies an original location of a first portion of the first file within the file system;
   determining, by reading the file header of the backup copy, the original location of the first portion of the first file within the file system;
   restoring the first portion of the first file by copying a first portion of the backup copy of the first portion of the first file to the original location of the first portion of the first file within the file system;
   restoring additional portions of the backup copy of the first file by copying the additional portions of the backup copy to available locations that are adjacent to the original location in which the first portion of the backup copy was copied.

2. The method of claim 1, wherein determining the original location of the first file within the file system comprises determining an original location, within the file system, of at least a beginning data block of the first file.

3. The method of claim 1, wherein the file-location information identifies an original location, within the file system, of at least a beginning data block of the first file.

4. The method of claim 3, wherein restoring the first file comprises copying a beginning data block of the backup copy of the first file to the original location of the beginning data block of the first file within the file system.

5. The method of claim 1, wherein restoring the first file comprises:
   determining whether the original location of the first file within the file system is available;
   when the original location is available, copying the backup copy of the first file to the original location of the first file;
   when the original location is not available, identifying an available location that is proximate to the original location and copying the backup copy of the first file to the available location.

6. The method of claim 3, wherein restoring the first file comprises:
   determining whether the original location of at least the beginning data block of the first file is available;
   when the original location of the beginning data block of the first file is available, copying at least a beginning data block of the backup copy of the first file to the original location of the beginning data block of the first file;
   when the original location of the beginning data block of the first file is not available, identifying an available location that is proximate to the original location of the beginning data block of the first file and copying at least the beginning data block of the backup copy of the first file to the available location.

7. The method of claim 1, wherein the file header further comprises file-identification information, the file-identification information comprising at least one of:
   a name of the first file; and
   a file-system path for the first file.

8. The method of claim 1, wherein the file header further comprises file-attribute information, the file-attribute information comprising at least one of:
   file-size information for the first file;
   access-rights information for the first file; and
   time-stamp information for the first file.

9. The method of claim 1, wherein locating the backup copy of the first file to be restored comprises identifying a most-recent backup copy from within a plurality of backup copies of the first file by comparing time-stamp information contained in file headers of the plurality of backup copies.

10. The method of claim 9, wherein determining the original location of the first file within the file system comprises identifying, based on file-location information contained in a file header of the most-recent backup copy, the location of the first file within the file system.

11. The method of claim 1, wherein restoring the first file comprises at least one of:
    retrieving the backup copy from a local storage device; and
    retrieving the backup copy from a remote storage device.

12. A computer-readable medium, comprising:
    a first computer-executable instruction operable to identify a backup copy of a first file to be restored, the backup copy comprising:
       a copy of contents of the first file;
       a file header comprising file-location information that identifies an original location of a first portion of the first file within the file system;
    a second computer-executable instruction operable to locate the backup copy of the first file;
    a third computer-executable instruction operable to determine, by reading the file header of the backup copy, the original location of the first portion of the first file within the file system; and
    a fourth computer-executable instruction operable to restore the first portion of the first file by copying a first portion of the backup copy of the first portion of the first file to the original location of the first portion of the first file within the file system;
    a fifth computer-executable instruction operable to restore additional portions of the backup copy of the first file by copying the additional portions of the backup copy to available locations that are adjacent to the original location in which the first portion of the backup copy was copied.

13. The computer-readable medium of claim 12, wherein the third computer-executable instruction operable to determine the original location of the first file within the file system comprises a computer-executable instruction operable to determine an original location, within the file system, of at least a beginning data block of the first file.

14. The computer-readable medium of claim 12, wherein the file-location information identifies an original location, within the file system, of at least a beginning data block of the first file.

15. The computer-readable medium of claim 13, wherein the fourth computer-executable instruction operable to restore the first file comprises one or more computer-executable instructions operable to copy a beginning data block of the backup copy of the first file to the original location of the beginning data block of the first file within the file system.

16. The computer-readable medium of claim 12, wherein the fourth computer-executable instruction operable to restore the first file comprises one or more computer-executable instructions operable to:
    determine whether the original location of the first file within the file system is available;
    when the original location is available, copy the backup copy of the first file to the original location of the first file; and when the original location is not available, identify an available location that is proximate to the original location and copy the backup copy of the first file to the available location.

17. The computer-readable medium of claim 13, wherein the fourth computer-executable instruction operable to restore the first file comprises one or more computer-executable instructions operable to:

determine whether the original location of at least the beginning data block of the first file is available;

when the original location of the beginning data block of the first file is available, copy at least a beginning data block of the backup copy of the first file to the original location of the beginning data block of the first file;

when the original location of the beginning data block of the first file is not available, identify an available location that is proximate to the original location of the beginning data block of the first file and copy at least the beginning data block of the backup copy of the first file to the available location.

18. The computer-readable medium of claim 12, wherein the second computer-executable instruction operable to locate the backup copy of the first file comprises one or more computer-executable instructions operable to identify a most-recent backup copy from within a plurality of backup copies of the first file by comparing time-stamp information contained in file headers of the plurality of backup copies.

19. The computer-readable medium of claim 12, wherein the third computer-executable instruction operable to determine the original location of the first file within the file system comprises one or more computer-executable instructions operable to identify, based on file-location information contained in a file header of the most-recent backup copy, the location of the first file within the file system.

20. The computer-readable medium of claim 12, wherein the fourth computer-executable instruction operable to restore the first file comprises one or more computer-executable instructions operable to:

retrieve the backup copy from a local storage device; or retrieve the backup copy from a remote storage device.

\* \* \* \* \*